United States Patent [19]

Telmet et al.

[11] 3,883,843
[45] May 13, 1975

[54] SEAT BELT SYSTEM WITH STARTER ENGINE LOCK AND ALARM

[75] Inventors: Juhan Telmet, Warren; Richard C. Stouffer, Auburn Heights, both of Mich.

[73] Assignee: Allied Chemical Corporation, New York, N.Y.

[22] Filed: Jan. 28, 1974

[21] Appl. No.: 437,580

[52] U.S. Cl. .......... 340/52 E; 340/278; 307/10.5 B; 180/82 C
[51] Int. Cl. ............................................ B60r 21/10
[58] Field of Search ...... 340/52 E, 278; 307/10.5 B; 180/82 C

[56] References Cited
UNITED STATES PATENTS

| | | | |
|---|---|---|---|
| 3,742,448 | 6/1973 | Motz | 340/52 E |
| 3,757,293 | 9/1973 | Petersen | 340/52 E |

Primary Examiner—Alvin H. Waring
Attorney, Agent, or Firm—Jonothan Plaut; Ernest D. Buff

[57] ABSTRACT

A safety belt system for vehicle passengers is provided with sequence responsive engine lock and alarm apparatus for energizing an alarm means and preventing application of power to the starter coil of the vehicle's starter motor until the occurrence of signals from seat and belt switches indicating that the safety belt is in proper position for operation of the vehicle. The belt switch is connected to the tap of a split coil relay having a plurality of coils connected to a power source through the collector-emitter circuit of a PNP transistor. The base of the transistor is connected to ground through a resistor and the seat switch. Circuit means connected to the seat and belt switches so as to be grounded when the belt switch is closed, disables the starter motor and energizes the alarm means while the seat is occupied until the belt is moved from a retracted to a protracted position.

9 Claims, 1 Drawing Figure

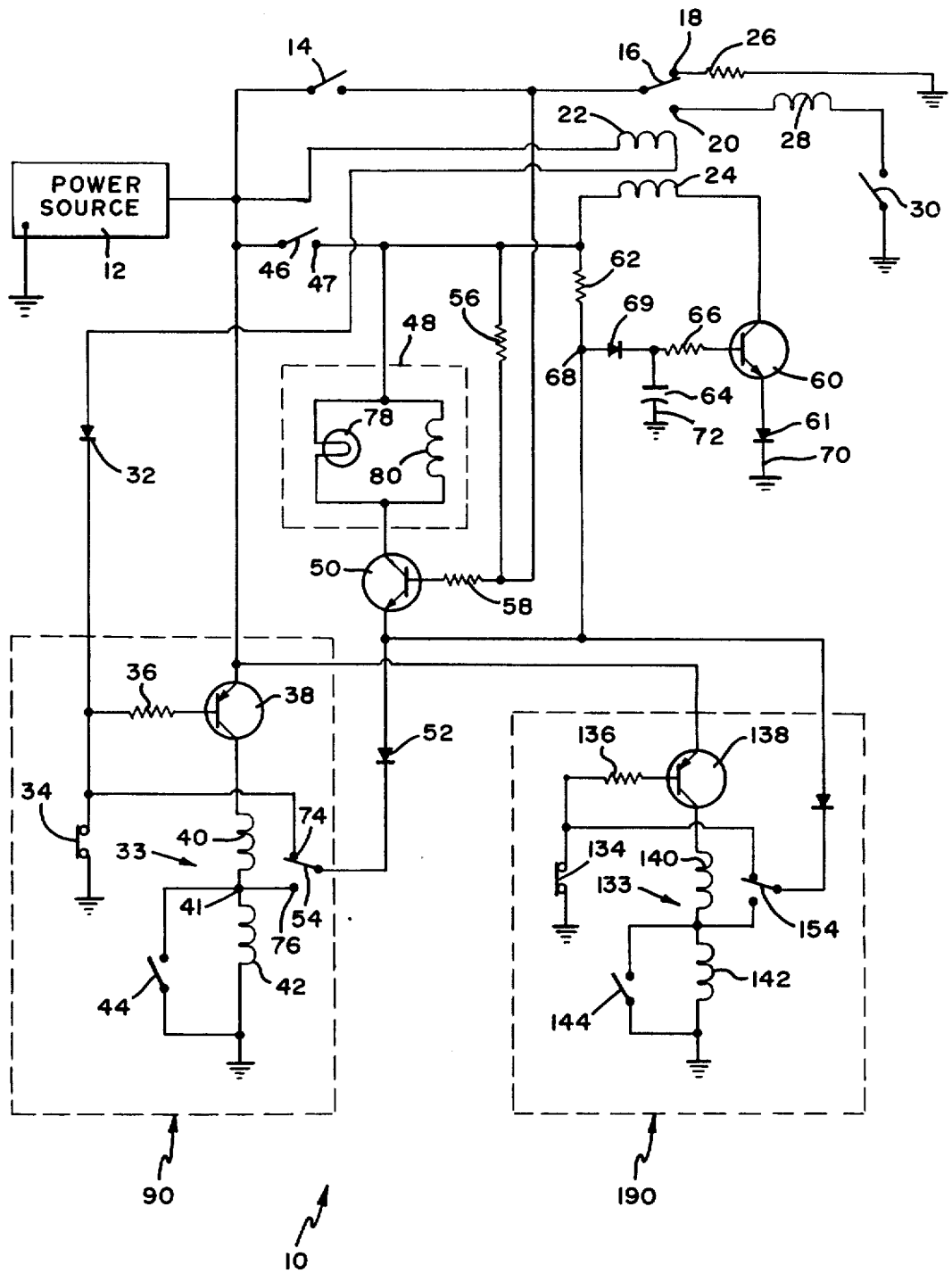

SEAT BELT SYSTEM WITH STARTER ENGINE LOCK AND ALARM

BACKGROUND OF THE INVENTION

1. Field of the Invention

This invention relates to a safety device for vehicle passengers and more particularly to an improved safety belt system having sequence responsive engine lock and alarm apparatus for energizing an alarm and preventing application of electrical power to the vehicle's starter motor until the occurrence of signals from switches associated with the vehicle's seats and safety belts indicating that the safety belts are in proper position for operation of the vehicle.

2. Description of the Prior Art

Safety belt systems of the type upon which this invention has improved are disclosed in copending application of Lewis and Jankowski, Ser. No. 255,740, filed May 22, 1972. According to that application, the safety belt system has interlock and alarm apparatus for disabling the starter motor and energizing an alarm, which apparatus is itself disabled in response to a particular sequence, that is, one wherein a vehicle occupant sits on the seat and subsequently extends the seat belt from the retractor. The apparatus is made responsive to the sequence through the use of a seat switch and first and second switches associated with the retractor. Such first and second switches are in parallel with one another and in series with the alarm and interlock circuits so that the alarm and interlock will be energized if either of the switches is closed. The first switch is mechanically linked to the retractor so that it is closed when the webbing is in a retracted position and opens when the webbing is extended. The second switch is closed by a signal produced upon closure of the seat switch but is interlocked to the first switch so that the second switch will not close if the first switch is closed at the time that the seat switch is closed. In order that the first and second switches may be placed in the open position so as to allow normal starting of the vehicle it is necessary to close the seat switch while the belt is retracted, to prevent closing of the second switch, and then to protract the belt, to open the first switch.

The sequence responsive interlock and alarm apparatus described above is commercially acceptable but is relatively complex, requiring a considerable number of costly electronic components. Further, many of the electronic components are subject to wear and may become insufficiently reliable when exposed to changing climatic conditions for prolonged periods of time.

SUMMARY OF THE INVENTION

The present invention provides a safety belt system having sequence responsive interlock and alarm apparatus which is economical to produce and highly reliable in operation. The safety belt system is adapted to be disposed in a vehicle having a starter motor and includes a belt having a protracted and a retracted position. A seat switch is connected to a source of electrical power and to the driver's seat of the vehicle. The seat switch has an open position when the seat is unoccupied and a closed position when the seat is occupied. A belt switch is associated with the belt so that the belt switch has an open position when the belt is in the protracted position and a closed position when the belt is in the retracted position. The belt switch is connected to the tap of a split coil relay having a plurality of coils connected to the power source through the collector-emitter circuit of a PNP transistor. The base of the transistor is connected to ground through a resistor and the seat switch. A circuit means is connected to the seat and belt switches so as to be grounded when the belt switch is in the closed position. The circuit means disables the starter motor and energizes an alarm means while the seat is occupied until the belt is moved from a retracted to a protracted position.

The sequence responsive interlock and alarm apparatus of this invention has significant structural advantages. The split coil relay can readily accommodate surge currents more than six times higher than that previously permitted for safety belt apparatus of this nature. Moreover, use of the split coil relay eliminates the need for the capacitors otherwise required to drive reed-operated switches and permits the number of electrical components to be greatly reduced. Sensitivity and durability of the system is increased and its maintenance cost is decreased. The apparatus is considerably less expensive to construct and far more reliable in operation than previous sequence-responsive interlock and alarm systems.

BRIEF DESCRIPTION OF THE DRAWINGS

The invention will be more fully understood and further advantages will become apparent when reference is made to the following detailed description and the accompanying drawing, which is a schematic electrical diagram of the sequence responsive interlock and alarm apparatus.

DESCRIPTION OF THE PREFERRED EMBODIMENT

Referring to the drawing, the sequence responsive interlock and alarm apparatus, shown generally at 10, has a power source 12 such as the storage battery of a motor vehicle in which the apparatus is disposed. A seat switch 34 is connected to the power source 12 and to the driver's seat of the vehicle (not shown). The seat switch 34 has an open position when the seat is unoccupied and a closed position when the seat is occupied. A belt switch 44 is associated with a safety belt (not shown) of the vehicle so that the belt switch 44 has an open position when the belt is in the protracted position and a closed position when the belt is in the retracted position. The belt switch is connected to the tap 41 of a split-coil relay, shown generally at 33, having a plurality of coils connected to the power source through the collector-emitter circuit of a PNP transistor 38. The base of the transistor 38 is connected to ground through a resistor 36 and the seat switch 34. A circuit means is connected to the seat and belt switches so as to be grounded when the belt switch 44 is in the closed position. The circuit means disables the starter motor (not shown) by preventing application of power to starter coil 28 and energizes an alarm means 48 while the seat is occupied (seat switch 34 is in its closed position) until the belt is moved from a retracted to a protracted position (belt switch 44 is moved to its open position).

The power source 12 has its negative terminal grounded to the vehicle chassis in the conventional manner and its positive terminal grounded through one of three parallel paths. The first path includes the series combination of a starter switch 14 and a safety start relay 16, which is moved from a position in contact with terminal 18 to a position in contact with terminal 20 upon application of power through coils 22 and 24. Terminal 18 is grounded through biasing resistor 26. Terminal 20 is grounded through starter coil 28 and gear selector switch 30, which has an open position when one of the drive gears of the engine's transmission is engaged and a closed position when the engine's transmission gear selector is in neutral or park. The second path includes the series combination of coil 22 and a diode 32 adapted to be grounded through the seat switch 34. The diode 32 is connected to a resistor 36 in series with the base-collector circuit of transistor 38 grounded through a splitcoil relay 33 composed of (1) coils 40 and 42 separated by tap 41, the latter coil being in parallel with a belt switch 44 and (2) a single pole double throw arm 54 adapted for movement between a first terminal 74 connected to seat switch 34 and a second terminal 76 connected to tap 41. The third path includes ignition switch 46 in series with a three branch network. The first branch of the network includes the series combination of alarm means 48, the collector-emitter circuit of transistor 50, diode 52, arm 54 of relay 33 and either of the parallel combination of belt switch 44 with coil 42, or seat switch 34. The second branch of the network includes the series combination of resistors 56 and 58, the base-emitter circuit of transistor 50, diode 52, the arm 54 of relay 33 and either of the parallel combination of belt switch 44 with coil 42, or seat switch 34. The third branch of the network includes the parallel combination of coil 24, the collector-emitter circuit of transistor 60 and diode 61 with biasing resistor 62, a diode 69 and the parallel combination of capacitor 64 with resistor 66, the base-emitter circuit of transistor 60 and diode 61. Diode 61 and capacitor 64 are grounded through lines 70 and 72, respectively. Junction 68, in series between resistor 62 and diode 69 is connected to the arm 54 of relay 33 through diode 52.

The alarm means 48 contains in parallel the combination of a lamp 78, located in the dashboard area of the vehicle so as to be readily visible to the driver, and an audio alarm means 80, which may be a buzzer, tone generator or the like.

The safety start relay 16 provides power to the starter coil 28, associated with the starter motor of the vehicle's engine. Accordingly, when the starter switch 14 is closed, power will be applied to the starter coil 28 if the arm of safety start relay is in contact with terminal 20 and switch 30 is in closed position.

In operation, when seat switch 34 is closed, a ground path is provided through the emitter-base junction of transistor 38 and resistor 36, whereby current is applied to the split coil relay 33. If belt switch 44 is closed, coil 42 is bypassed and the current through coil 40 is increased, causing the single pole, double throw arm 54 of relay 33 to contact terminal 76. A ground is thereby placed on the arm 54 of relay 33 which causes the emitter of transistor 50 to be returned to ground.

Transistor 38 is a PNP transistor which is biased on upon providing a ground path for the base current thereof. The value of base resistor 36 depends upon the gain of transistor 38 and the current required to operate relay arm 54. Preferably, the value of resistor 36 is sufficiently low to provide the minimum current required for operation of transistor 38 at minimum gain and low temperature extremes. The value of coil 40 depends upon the magnitude of forces required to move the arm 54 of relay 33 into contact with terminal 76. Typical values for these components are set forth below:

| Component | Value |
| --- | --- |
| Transistor 38 (gain) | 10 |
| Coil 40 | 200 ohms |
| Resistor 36 | 1000 ohms |

With the apparatus arranged as above and the ignition switch 46 closed, placing its arm in contact with terminal 47, the resistance provided by resistor 26 is sufficiently lower than the resistance offered by resistor 56 that the voltage required to bias transistor 50 on is not developed across resistor 26. Thus, despite the presence of a ground path through the emitter-base circuit of transistor 50, the latter remains in the non-conductive state, and the warning means 48 is not energized.

Transistor 50 is a NPN transistor which is biased off upon providing a ground path through resistor 26. The values of resistors 56 and 58 depend upon the voltage requirements of lamp 78 and audible alarm 80 and the gain of transistor 50. Resistor 26 has a value sufficiently below the value of resistor 56 that the voltage divider formed by the combination of resistors 56 and 26 will maintain transistor 50 in the non-conductive state. Typical values for these components are set forth below:

| Component | Value |
| --- | --- |
| Transistor 50 (gain) | 15 |
| Resistor 26 | 200 ohms |
| Resistor 56 | 3000 ohms |
| Resistor 58 | 1000 ohms |
| Lamp 78 | 350 milli amperes, 14 volts |
| Audible Alarm 80 | 120 milli amperes, 12 volts |

Closure of the starter switch 14, with the apparatus arranged as above, upsets the voltage divider formed by resistors 56 and 26. The voltage applied to base resistor 58 is thereby increased biasing transistor 50 on. A current path is provided from power source 12 and ignition switch 46 through the warning means 48 transistor 50, diode 52, arm 54 of relay 33 and seat belt switch 44, thereby energizing the warning means 48. Junction 68 is grounded through diode 52, the arm 54 of relay 33 and seat belt switch 44, with the result that current flow in resistor 66 is prohibited and transistor 60 is biased off. Hence current flow through coil 24 is prohibited, relay 16 remains in contact with terminal 18, voltage is not applied to starter coil 28 and the starter coil 28 is disabled.

Transistor 60 is an NPN transistor which is biased off upon providing a ground path through relay 54. Diode 52 isolates the seat switch 34 and belt switch 44 from the warning and interlock circuitry. The values of resistors 62 and 66 depend on the resistance of coil 24 and the gain of transistor 60. Typical values for these components are set forth below:

| Component | Value |
| --- | --- |
| Transistor 60 (gain) | 10 |

-Continued

| Component | Value |
|---|---|
| Diode 52 | 1 ampere, 50 peak inverse voltage |
| Resistor 62 | 2000 ohms |
| Resistor 66 | 4700 ohms |
| Coil 24 | 50 ohms |

Activation of the interlock and alarm means is not avoided if the safety belt is buckled before the user enters the car, that is, if the belt switch 44 is first opened and the seat switch 34 is subsequently closed with the relay arm 54 in contact with terminal 74. Closure of seat switch 34 grounds the base of transistor 38 to provide a current path through the emitter-collector circuit thereof and coils 40 and 42 to ground. Due to the increased resistance provided by the presence of coil 42, the current in coil 40 is insufficient to pull the arm of relay 54 into contact with terminal 76. A current path to ground is thereby provided to diode 52 through relay arm 54 and seat switch 34. Upon closure of ignition and starter switches 46 and 14, transistor 60 is rendered non-conductive, the warning means 48 is energized and the starter motor is maintained disabled.

The alarm means will continue to be energized and the starter motor will continue to be disabled if the seat belt is subsequently retracted. Closure of belt switch 44 operates to short out coil 42 while maintaining the grounded condition of relay arm 54.

The alarm means 48 will not become energized and the starter motor will be enabled if the seat switch 34 is closed while the belt switch 44 is closed and the belt switch 44 is subsequently moved to an open position. Closure of seat switch 34 grounds the base of transistor 38 and energizes coil 40 of relay 33 pulling the arm 54 of the relay 33 into contact with terminal 76. Upon movement of belt switch 44 to the open position, coil 42 becomes energized. The electronegative force applied to the arm 54 of relay 33 through coils 40 and 42, although not sufficient to pull in the relay, has sufficient magnitude to hold it in its energized state in contact with terminal 76. Hence the direct ground path at terminal 76 of relay 33 is replaced by a ground path which includes the resistance of coil 42. The additional resistance provided to the ground path by the coil 42 has sufficient magnitude to prevent the warning means 48 from being energized regardless of the state of conductivity held by transistor 50.

In like manner, the ground extant at junction 68 is replaced by the resistance of coil 42. A voltage divider network is thereby established which raises the potential of the junction 68. Voltage across coil 42 is higher than the voltage at junction 68. Thus, current is applied through diode 69 to base resistor 66, biasing transistor 60 on. Coil 24 is thereby grounded through the collector-emitter circuit of transistor 60 and diode 61. Thus, coil 24 is energized and the electromagnetic force produced by coils 22 and 24 causes the arm of relay 16 to contact terminal 20. Subsequent closure of starter switch 14 with the transmission placed in park or neutral establishes a current path to ground through relay 16, starter coil 28 and switch 30.

Diode 61 functions as a biasing diode for transistor 60. Coil 42 functions as a holding coil for the relay arm 54. Coil 22 functions in a manner hereinafter described to hold the relay arm 16 closed as long as seat switch 34 remains closed. Typical values for these components are set forth below:

| Component | Value |
|---|---|
| Diode 61 | 1 ampere, 50 peak inverse volts |
| Coil 22 | 500 ohms |
| Coil 42 | 3000 ohms |

Belt switch 44, seat switch 34, transistor 38, base resistor 36 and split coil relay 33 collectively represent a seat unit, indicated generally at 90. Preferably each of the remaining seats of the vehicle is provided with a unit of the type indicated generally at 190. Belt switch 144, seat switch 134, transistor 136 coils 140 and 142 and arm 154 of split coil relay 133 and resistor 136 are constructed and operated in the same manner as the corresponding components associated with unit 90. However, the seat switch 34 is not connected to power source 12 through diode 32 and coil 22. This feature serves to prevent the car from being started unless an occupant seated in the driver's seat has properly followed the sequence prescribed by unit 90.

Once vehicle occupants have buckled up in accordance with the sequence prescribed by units 90 and 190, alarm means 48 and starter coil 28 are not effected by transient changes in the condition of seat switches 34 and 134. If, for example, seat switch 34 is opened momentarily so that transistor 38 is biased off, the current path to ground through resistor 62 arm 54 and coil 42 of relay 33 provides sufficient electromagnetic force to hold arm 54 in contact with terminal 76. Capacitor 64 provides sufficient current in the base-emitter circuit of transistor 60 to maintain the transistor 60 in its conductive state.

The value of capacitor 64 is sufficiently large that its discharge time maintains the conductive state of transistor 60 for at least about 5 seconds and preferably about 7 seconds. Diode 69 blocks discharge of current from capacitor 64 through arm 54 of relay 33 to ground. Typical values for these components are set forth below:

| Component | Value |
|---|---|
| Capacitor 64 | 50 microfarads |
| Diode 69 | 1 ampere, 50 peak inverse volts |

Once the seat belts have been fastened in accordance with the prescribed sequence, the alarm means 48 will not be energized and starter coil 28 will not be disabled if the car stalls or either or both of starter switch 14 or ignition switch 46 are opened. The electromagnetic force provided upon energization of coil 22, though insufficient in magnitude to move arm 16 into contact with terminal 20, is sufficient in magnitude to maintain such contact once established. As previously noted, coil 22 is energized upon closure of seat switch 34. Hence until the driver's seat is vacated the car can be restarted repeatedly without following the prescribed sequence. Moreover, with the ignition switch closed and the gear selector placed in park or neutral, the driver can unbuckle his seat belt, vacate the driver's seat to cure an emergency condition of the vehicle, for example, and re-enter and re-start the vehicle without following the prescribed sequence.

Once fastened in accordance with the prescribed sequence, the seat belt can be unbuckled with the gear selector in park or neutral for convenience of vehicle occupants without energizing alarm means 48 or disabling starter coil 28. Closure of belt switch 44 reinstates the ground at terminal 76 of relay 33. A ground path is provided from the base of transistor 50 through relay 16 starter coil 28 and switch 30, biasing transistor 50 off and preventing energization of the alarm means 48. If the transmission is placed in a driving gear, switch 30 opens, the ground path through starter coil 28 is interrupted and sufficient voltage is applied through ignition switch 46 and resistor 56 to bias transistor 50 on. Alarm means 48 is thereby activated to warn vehicle occupants of the improper condition of the seat belt.

Having thus described the invention in rather full detail, it will be understood that these details need not be strictly adhered to but that various changes and modifications may suggest themselves to one skilled in the art, all falling within the scope of the invention as defined by the subjoined claims.

I claim:

1. A safety system adapted to be disposed in a vehicle having a starter motor and including a belt having a protracted and a retracted position comprising:
   a. a power source for supplying electrical power;
   b. a seat switch connected to said power source and associated with the driver's seat of the vehicle;
   c. said seat switch having an open position when said seat is unoccupied and a closed position when said seat is occupied;
   d. a belt switch associated with said belt and having an open position when said belt is in protracted position and a closed position when said belt is in retracted position, said belt switch being connected to the tap of a split coil relay having a plurality of coils connected to said power source through the emitter-collector circuit of a PNP transistor, the base of said transistor being connected to ground through a resistor and said seat switch;
   e. circuit means associated with said starter motor and connected to said seat and belt switches through the arm of said split coil relay so as to be grounded when said belt switch is in the closed position for disabling said starter motor while the seat is occupied until the belt is moved from a retracted to a protracted position.

2. Apparatus as recited in claim 1, wherein said split coil relay includes a plurality of coils and said arm of said split coil relay comprises a single pole double throw arm adapted for movement between a first terminal connected to said seat switch and a second terminal connected to said tap.

3. Apparatus as recited in claim 2, wherein said belt switch is in series with a first coil of said relay and in parallel with a second coil thereof.

4. Apparatus as recited in claim 3, wherein said circuit means includes an alarm means in series with said ignition switch and the arm of said split coil relay.

5. Apparatus as recited in claim 4, wherein said power source is returned to ground through at least one of three parallel paths.

6. Apparatus as recited in claim 5 wherein the first path includes in series the combination of a starter switch, a safety start relay adapted to be moved from a position in which the relay is grounded through a biasing resistor to a position in which the relay is grounded through a starter coil for the engine's starter motor and a gear selector switch which has an open position when one of the forward gears is engaged and a closed position when the engine's transmission is in neutral or park.

7. Apparatus as recited in claim 6, wherein the second path includes in series the combination of a first coil of said safety start relay and a diode adapted to be grounded through said seat switch.

8. Apparatus as recited in claim 7, wherein the third path includes an ignition switch in series with a three branch network, the first branch including said alarm means, the collector-emitter circuit of a first NPN transistor, the arm of said split coil relay and either of the parallel combination of said belt switch with said second coil of said split coil relay or said seat switch, the second branch of said network including the series combination of a biasing resistor with a base resistor the base-emitter circuit of said first NPN transistor, the arm of said split coil relay and either of the parallel combination of said belt switch with said second coil of said split coil relay or said seat switch, and the third branch including the combination of a second coil of said safety start relay and the collector-emitter circuit of a second NPN transistor in parallel with a biasing resistor, a diode and the parallel combination of a capacitor with a base resistor and the base-collector circuit of said second NPN transistor.

9. Apparatus as recited in claim 4, wherein said alarm means includes the parallel combination of a lamp and an audible alarm.

* * * * *